(12) United States Patent
Ito et al.

(10) Patent No.: US 7,933,326 B2
(45) Date of Patent: Apr. 26, 2011

(54) ENCODED DATA MODIFICATION DEVICE, MODIFICATION METHOD, AND MODIFICATION PROGRAM

(75) Inventors: Hiroshi Ito, Tokyo (JP); Koichi Magai, Tokyo (JP); Mitsuyoshi Suzuki, Tokyo (JP); Shigenori Takai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1679 days.

(21) Appl. No.: 11/184,836

(22) Filed: Jul. 20, 2005

(65) Prior Publication Data
US 2006/0236130 A1 Oct. 19, 2006

(30) Foreign Application Priority Data
Apr. 15, 2005 (JP) .................... 2005-118293

(51) Int. Cl.
*H04N 7/12* (2006.01)
*G06K 9/00* (2006.01)
(52) U.S. Cl. .................... 375/240.01; 382/100
(58) Field of Classification Search ............. 375/240.01
See application file for complete search history.

(56) References Cited

U.S. PATENT DOCUMENTS

| | | | | |
|---|---|---|---|---|
| 6,175,639 B1* | 1/2001 | Satoh et al. | ................... | 382/100 |
| 2001/0044899 A1* | 11/2001 | Levy | ............... | 713/176 |
| 2001/0047478 A1* | 11/2001 | Mase | ............... | 713/176 |
| 2001/0054144 A1* | 12/2001 | Epstein et al. | ............... | 713/161 |
| 2002/0090114 A1* | 7/2002 | Rhoads et al. | ............... | 382/100 |

OTHER PUBLICATIONS

Frank Hartung et al., International Conf. on Image Processing, pp. 2621 to 2624, 1997.
Adnan M. Alattar et al., IEEE Trans., on Circuits & Systems for VT, vol. 13, No. 8, pp. 787 to 800, Aug. 2003.

* cited by examiner

*Primary Examiner* — Joseph G Ustaris
*Assistant Examiner* — Anner Holder
(74) *Attorney, Agent, or Firm* — Birch, Stewart, Kolasch & Birch, LLP.

(57) ABSTRACT

An encoded data modification device and the like are obtained which are capable of modifying a signal with a small delay. There is provided the encoded data modification device, including: an operational buffer that stores inputted encoded data formed of a plurality of encoded units; a decoder circuit that decodes the encoded data stored in the operational buffer; a modification circuit that modifies a first encoded unit of the decoded data and modifies following decoded encoded units according to the modification; an encoder circuit that re-encodes the modified data; an operational circuit that judges whether the modification is contained in the data in the buffer; and a write control circuit that rewrites the encoded data stored in the operational buffer to the data modified by the modification circuit and re-encoded by the encoder circuit when the operational circuit judges that the modification is contained in the data in the buffer.

3 Claims, 4 Drawing Sheets

FIG. 2

| | $C_1$ | $C_2$ | $C_3$ | $C_4$ | $C_5$ | $C_6$ | |

$t_1$   $t_2$   $t_3$   $t_4$   $t_5$   $t_6$   ...

ENCODED DATA MODIFICATION DEVICE, MODIFICATION METHOD, AND MODIFICATION PROGRAM

BACKGROUND OF THE INVENTION

1. Field of the Invention

The present invention relates to an encoded data modification device, a modification method, and a modification program that are capable of embedding electronic watermarks with small delays, in which, in embedding an electronic watermark in, e.g., MPEG-encoded video data without decoding the video data, judging means is provided to judge whether the data can be modified within a predetermined delay.

2. Description of the Related Art

Recently, a need to modify already encoded data has been arising because of, e.g., demands to prevent illegal copies by adding a unique code to the content in network distribution of video signal. In such a process, modifying the video signal itself according to predetermined rules to convert the total content into a different form is called fingerprinting or electronic watermarking, which is more secure than techniques in which some information is simply written in headers. When the process is performed during a distribution of content, a technique is desired which adds the target modification with the least decoding of the encoded data. In such a case, when the encoded data is transmitted at a given rate, the amount of code, after modified, should not be increased because it may result in overflow of decoder buffers.

There are several conventional methods that prevent an increase in the amount of code. For example, a method is disclosed in which data is left unmodified when the amount of code is increased (for example, see F Hartung and B. Girod, "Digital Watermarking of MPEG-2 Coded Video in the Bitstream Domain," Proceedings of International Conference on Omge Processing, 1997). Also, another method is disclosed in which, after modification, the absolute values of DCT coefficients are decreased until the increase in the mount of code is eliminated (for example, see A. M. Allattar, E. T. Lin, and M. U. Celik, "Digital Watermarking of Low Bit-Rate Advanced Simple Profile MPEG-4 Compressed Video," IEEE Transactions on Circuits and Systems for Video Technology, vol. 13 no. 8, 00. 787-800, August 2003.).

The conventional methods detect whether modification of a signal increases the amount of code, and inhibit the modification or reduce other information in the case of an increase of the amount of code so as to finally avoid the increase. However, because data is variable-length encoded, a modification of one signal may affect the encoded data to varying extents. This causes a need to provide a memory capable of storing the largest possible amount, leading to a problem of large signal delays.

SUMMARY OF THE INVENTION

The present invention has been made to solve the problems above, and an object of the invention is to provide an encoded data modification device, modification method, and modification program that are capable of modifying signals with small delays, in which means for detecting whether the modification of signal falls within the range of data stored in the memory is provided; and the signal modification is permitted only when the modification falls within the range and the amount of code does not increase over a predetermined value.

An encoded data modification device according to the present invention includes: a buffer that stores inputted encoded data formed of a plurality of encoded units; a decoder circuit that decodes the encoded data stored in the buffer; a modification circuit that modifies a first encoded unit of the decoded data and modifies following encoded units decoded according to the modification; an encoder circuit that re-encodes the modified data; a first operational circuit that judges whether the modification is closed in the data in the buffer; and a write control circuit that rewrites the encoded data stored in the buffer to the data modified by the modification circuit and re-encoded by the encoder circuit when the first operational circuit judges that the modification is closed in the data in the buffer.

The encoded data modification device according to the present invention offers the effect to enable signal modification with small delays.

BRIEF DESCRIPTION OF THE DRAWINGS

In the accompanying drawings:

FIG. 2 is a diagram illustrating a structure of encoded data inputted to the encoded data modification device according to the first embodiment of the present invention;

DESCRIPTION OF THE PREFERRED EMBODIMENTS

First Embodiment

Figure 1:
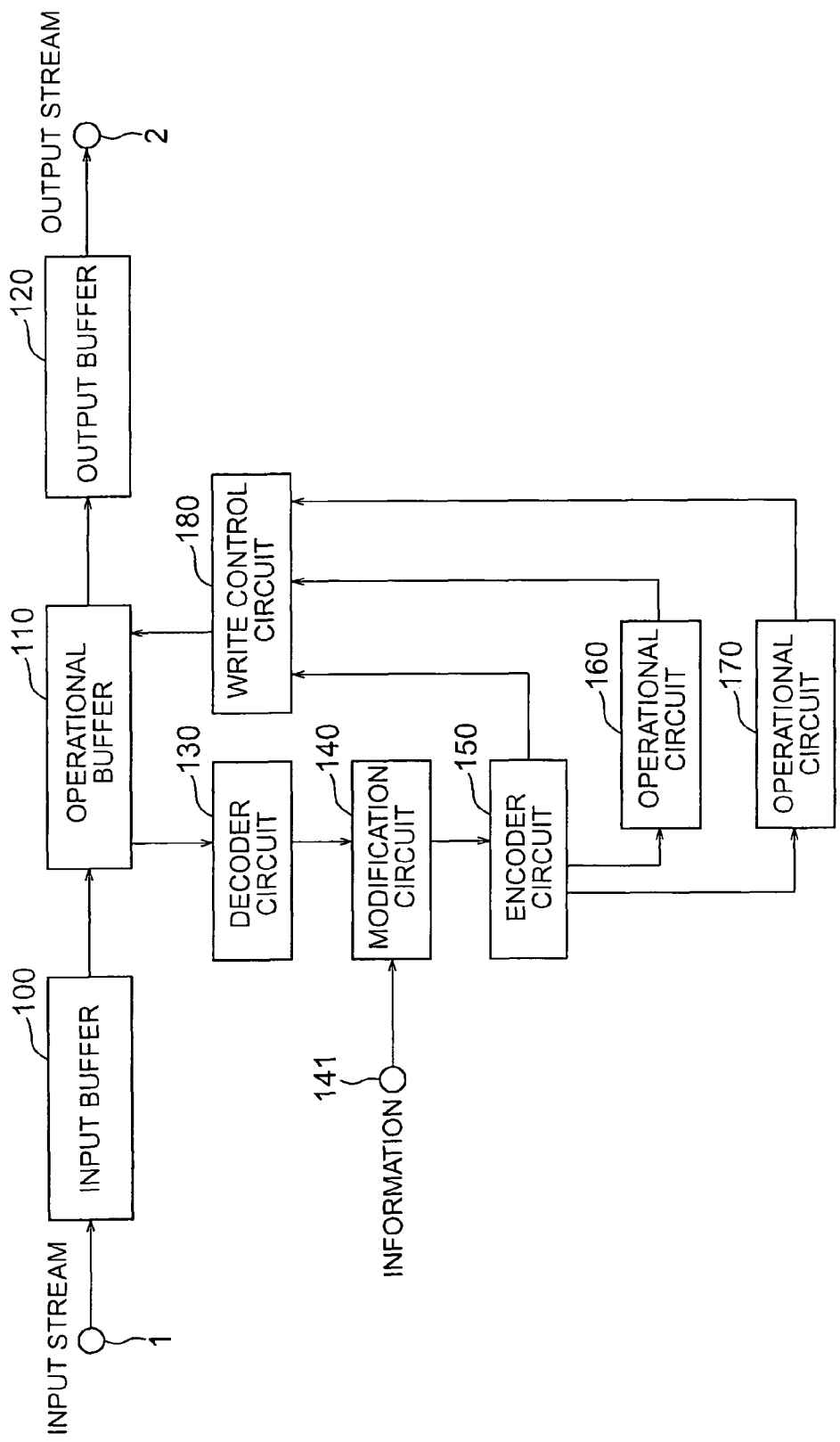
FIG. 1 is a block diagram showing a configuration of the encoded data modification device according to a first embodiment of the present invention.

An encoded data modification device according to a first embodiment of the present invention will now be described referring to FIGS. 1 to 4. FIG. 1 is a block diagram showing a configuration of the encoded data modification device according to the first embodiment of the invention. In the diagrams, the same reference characters show the same or corresponding parts.

In FIG. 1, the encoded data modification device of the first embodiment includes: an input buffer 100 connected with an input terminal 1, for accumulating inputted encoded data; an operational buffer 110 connected with the input buffer 100; an output buffer 120 connected with the operational buffer 110 and with an output terminal 2; a decoder circuit 130 connected with the operational buffer 110; a modification circuit 140 connected with the decoder circuit 130; an encoder circuit 150 connected with the modification circuit 140; an operational circuit 160 connected with the encoder circuit 150; an operational circuit 170 connected with the encoder circuit 150; and a write control circuit 180 connected with the encoder circuit 150, the operational circuit 160, and the operational circuit 170.

Next, operations of the encoded data modification device according to the first embodiment will be described referring to the drawings.

Figure 2:
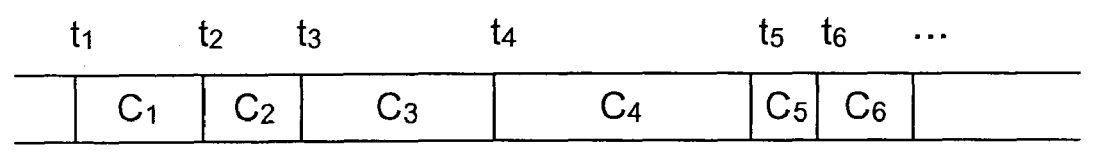
Figure 3:
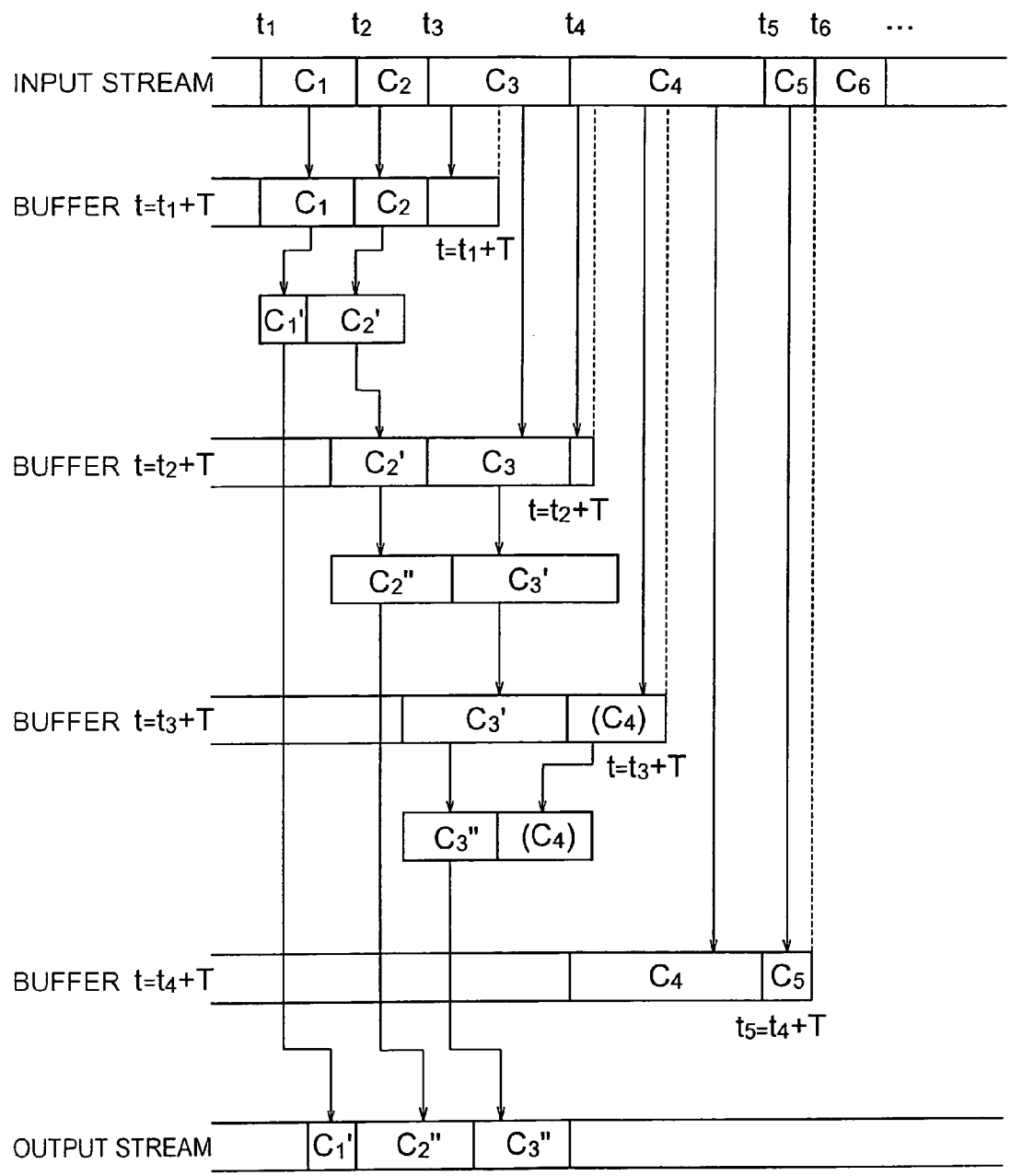
FIG. 3 is a diagram illustrating operations of the encoded data modification device according to the first embodiment of the present invention.

FIG. 2 is a diagram illustrating a structure of encoded data inputted to the encoded data modification device of the first embodiment of the invention. FIG. 3 is a diagram illustrating operations of the encoded data modification device of the first embodiment of the invention.

As shown in FIG. 2, the input encoded data applied to the input terminal 1 of the encoded data modification device shown in FIG. 1 is formed of a plurality of encoded units. The encoded units are represented as $C_1$, $C_2$, and so on. The encoded units are macroblocks of MPEG (Motion Pictures Expert Group), for example. The lengths of the encoded units may differ from each other. For the sake of simplicity of explanation, FIG. 2 does not show information like headers inserted between the encoded units.

The input encoded data is transferred to the operational buffer 110 through the input buffer 100. The input buffer 100 is a buffer that temporarily stores encoded data transmitted at a given rate. The contents of the input buffer 100 are transferred to the operational buffer 110 as described below in synchronization with the encoded units. That is, when the first bit of an Nth encoded unit of the input encoded data arrives at the input buffer 100 at time tN, the signal that has been accumulated in the input buffer 100 from the time tN to time tN+T is transferred to the operational buffer 110 at the time tN+T (where T is a constant). The operational buffer 110 selects only a necessary part of the transferred signal and holds it for the modification process.

The contents of the operational buffer 110 are decoded by the decoder circuit 130 and modified by the modification circuit 140. The modification circuit 140 makes the modification in accordance with information from an input terminal 141, in which, for example, the quantization values of MPEG-encoded DCT (Discrete Cosine Transform) coefficients are increased by 1, or decreased. Such modification is made for the purpose of adding particular information to the video stream, e.g., by electronic watermarking. Assuming such a situation, FIG. 1 shows the input terminal 141 for input of the information to the modification circuit 140. The decoder circuit 130 does not have to totally decode the encoded data, but decodes data to such an extent that the modification circuit 140 is capable of operating. For instance, in the example above, decoding the encoded data to the quantization values of DCT coefficients suffices, and there is no need to apply an inverse DCT transform etc. thereto.

The signal modified in the modification circuit 140 is re-encoded in the encoder circuit 150 and transferred to the operational buffer 110 via the write control circuit 180. At this time, the contents of the operational buffer 110 are rewritten with the new signal. The write control circuit 180, for controlling whether to permit the updating according to predetermined rules, validates modification to the encoded data only when the two conditions below are fulfilled.

The first condition is that the modification of encoded data is contained in the signal stored in the operational buffer 110. In general, modifying part of an encoded data signal requires modifying the subsequent signal accordingly, in order to keep the legality of the data. While the encoder circuit 150 re-encodes the signal to keep the data legality, the encoder circuit 150 is unable to output complete encoded data when the modification in the modification circuit 140 extends out of the range of the signal stored in the operational buffer 110. The operational circuit 160 detects this situation, and when the encoded data modification extends out of the range of the operational buffer 110, the operational circuit 160 supplies the write control circuit 180 with a signal for inhibiting rewrite of the operational buffer 110.

The second condition is that the encoded data does not overflow. When the modification device shown in FIG. 1 is inserted in a circuit that transmits data at a given rate, the modification of encoded data should not change the communication rate. Even in other cases, it is not desired that the volume of encoded data increases over a given value. The operational circuit 170 monitors the code length of encoded data re-encoded in the encoder circuit 150, and when the code length exceeds a predetermined value, the operational circuit 170 supplies the write control circuit 180 with a signal for inhibiting rewriting the operational buffer 110.

FIG. 3 is a diagram specifically illustrating the operation of the modification device of FIG. 1 in an example in which the encoded data of FIG. 2 is applied as the input. It is assumed hereinafter that the encoded data is an MPEG-2 video elementary stream and the encoded units $C_i$ are macroblocks. It is also assumed that the operational buffer 110 has a sufficiently large capacity.

First, at time $t_1+T$, the macroblocks $C_1$ and $C_2$ and part of the macroblock $C_3$ are transferred from the input buffer 100 to the operational buffer 110. The modification is applied to a single DCT coefficient of the macroblock $C_1$. In MPEG-2, except in special cases, the modification is contained in the macroblocks $C_1$ and $C_2$. While the macroblocks $C_1$ and $C_2$ are thus modified respectively to $C_1'$ and $C_2'$, the modification is contained in the operational buffer 110. The first condition is therefore fulfilled. Also, when the total code length of the macroblocks $C_1'$ and $C_2'$ is smaller than that of $C_1$ and $C_2$ and the second condition is also fulfilled, then the modification to the macroblock $C_1$ is regarded as valid and the macroblocks $C_1$ and $C_2$ in the operational buffer 110 are rewritten to $C_1'$ and $C_2'$. The macroblock $C_1'$ is instantaneously transferred to the output buffer 120. The macroblock $C_1'$ written in the output buffer 120 is read at a given rate after a delay time S and outputted as modified encoded data. The time S is a delay that is introduced to prevent buffer underflow when the encoded data becomes small.

Now, when the processing rate at which the encoded data is modified is sufficiently faster than the communication rate of the encoded data, then the time required to rewrite the operational buffer 110 is negligible, and the delay time from when the input encoded data arrives at the input buffer 100 to when the modified encoded data is read from the output buffer 120 is T+S.

Next, referring to FIG. 3 again, at time $t_2+T$, the macroblocks $C_2$ and $C_3$ and part of the macroblock $C_4$ are transferred from the input buffer 100 to the operational buffer 110. Now, because the macroblock $C_2$ has already been modified to $C_2'$, this part of the operational buffer 110 is not rewritten. As a result, $C_2'$, $C_3$, and part of $C_4$ are stored in the operational buffer 110. Then, a new modification process is applied to the macroblock $C_2'$ and thus the macroblocks $C_2'$ and $C_3$ are modified respectively to $C_2''$ and $C_3'$.

Now, while the total code length of the macroblocks $C_2''$ and $C_3'$ is larger than that of $C_2'$ and $C_3$, the difference is within a predetermined range, and so the contents of the operational buffer 110 are changed to the macroblocks $C_2''$ and $C_3'$, and $C_2''$ is transferred to the output buffer 120.

Similarly, at time $t_3+T$, the macroblock $C_3$ and part of the macroblock $C_4$ are transferred from the input buffer 100 to the operational buffer 110, and the operational buffer 110 holds the macroblock $C_3'$ and the part of $C_4$. While the macroblock $C_3'$ is then modified, if the modification affects $C_4$, the modification to the encoded data is then not contained in the data of the operational buffer 110. This modification is therefore not valid. On the other hand, this modification is valid if the modification is contained in the macroblock $C_3'$. FIG. 3 shows the latter case, where the contents of the operational buffer 110 are rewritten to $C_3''$, which is instantaneously transferred to the output buffer 120.

Next, a method of controlling the code length will be described using the above-described encoded data as an example. Now, suppose an Nth macroblock is modified.

When the code length of this macroblock in the input stream is L(N) and the corresponding code length exhibited after the DCT coefficient modification to this macroblock is LW (N), then the difference between the code lengths caused by the modification is given by the expression (1) below:

$$D(N)=L(N)-LW(N) \quad (1)$$

As stated earlier, in an MPEG-2 video stream, a DCT coefficient modification is contained in the macroblock that includes the DCT coefficient and the next "encoded" macroblock. While MPEG-2 involves macroblocks specifically carrying no information, the word "encoded" means that such macroblocks are excluded.

When an (N+M)th macroblock is encoded following the Nth macroblock, then the code length difference caused by the modification of this macroblock is given by the expression (2) below, and so the DCT coefficient modification finally causes the code length difference given by the expression (3) below:

$$D(N+M)=L(N+M)-LW(N+M) \quad (2)$$

$$D(N)+D(N+M)=L(N)+L(N+M)-LW(N)-LW(N+M) \quad (3)$$

Then, B(N) is defined by the expression (4) below as:

$$B(N)=D(1)+D(2)+\ldots+D(N) \quad (4)$$

B (N) is obtained by adding up the code length differences to the Nth macroblock. Now, a sufficient condition under which the modification causes no overflow and no underflow of the stream is given by the expression (5) below:

$$S \geq B(N-1)+D(N)+D(N+M) \geq 0 \quad (5)$$

The operational circuit 170 judges whether the stream outputted from the encoder circuit 150 fulfills the expression (5) and controls the write control circuit 180 according to the result.

In the expression (5), while B(N) always varies between 0 and S, B (N) may be reset to 0 at given cycles of the stream. In an MPEG-2 stream, a number of macroblocks constitute a slice and a number of slices constitute a picture. A picture corresponds to a frame of the motion picture. Then, for example, B(N) may be reset as N=0 and B(0)=0 at the beginning of a picture. When B(N) at the end of the previous picture is not 0, stuff bits corresponding to the B(N) are added at the end. This makes the picture lengths in the modified stream always equal to those of the input stream.

The description above has shown an example that applies the modification to a single part of an encoded unit and checks whether the modification is valid or invalid, but a plurality of modifications may be applied to a single encoded unit. In this case, a check is made about each modification to see whether it is valid or invalid, and the operational buffer 110 is repeatedly rewritten when valid and not rewritten when invalid. The transfer of encoded unit from the operational buffer 110 to the output buffer 120 is executed when all modifications have been completed.

Figure 4:
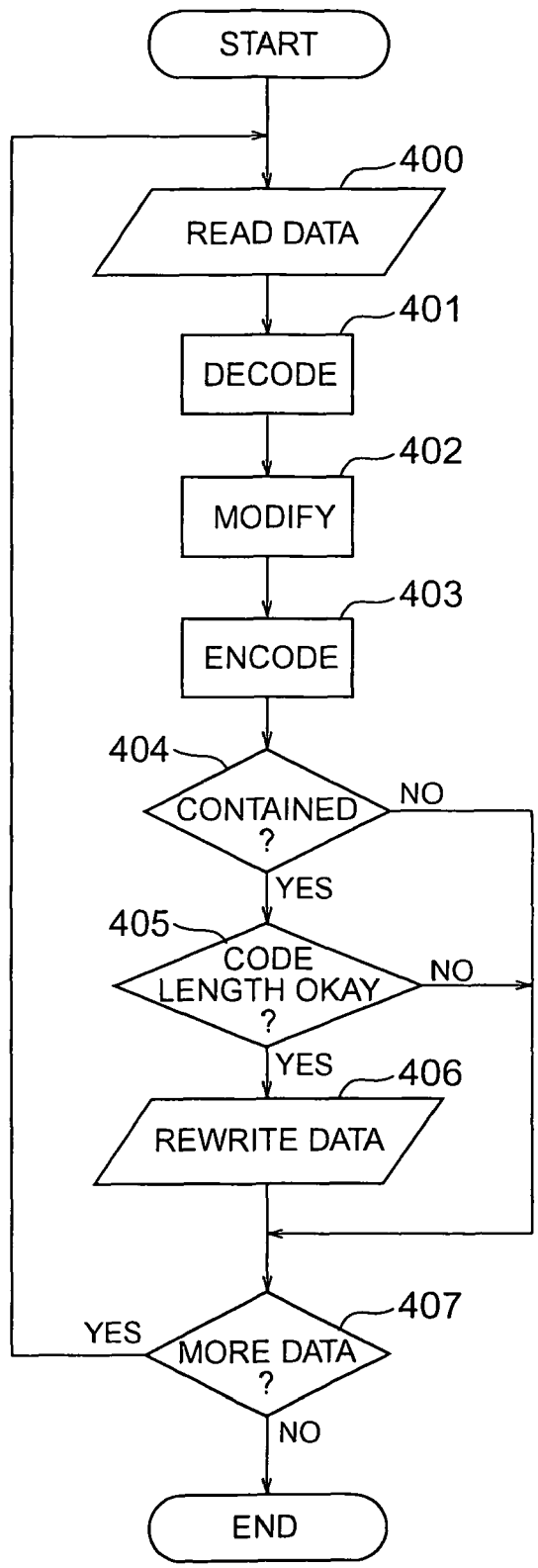
FIG. 4 is a flowchart showing an encoded data modification program according to the first embodiment of the present invention.

FIG. 4 is a flowchart showing an encoded data modification program according to the first embodiment of the present invention.

In a step 400, the input encoded data is read to the operational buffer 110 through the input buffer 100. In a step 401, the read encoded data is decoded. In a step 402, the decoded data is modified as above. In a step 403, the modified data is encoded. In a step 404, it is checked whether the modification is closed in the read data. In a step 405, it is checked whether the modification causes overflow of the encoded data. In a step 406, the encoded data is rewritten when the two conditions above are fulfilled. Then, in a step 407, it is checked whether all data has been processed, and if not, the flow returns to the step 400 to repeat the steps.

The encoded data modification program is similar to the operation of the modification device described above. That is, the encoded data read in the reading step 400 is decoded, modified, and encoded, and the input encoded data is rewritten to the modified data in the rewriting step 406 only when the result fulfills the conditions of the judging steps 404 and 405.

As described so far, according to the present invention, it is checked whether the modification of encoded data falls within the range of already obtained data, and the modification is validated only when the modification is contained and the variation of the amount of code meets a given condition, which offers an effect that the encoded data can be modified with a small delay. Alternatively, modification may be validated just when contained (when the first condition is fulfilled only).

What is claimed is:

1. An encoded data modification device, comprising:
   a buffer that stores inputted encoded data formed of a plurality of encoded units;
   a decoder circuit that decodes the encoded data stored in the buffer;
   a modification circuit that modifies a first encoded unit of the decoded data and modifies following encoded units decoded according to this modification;
   an encoder circuit that re-encodes the modified data;
   a first operational circuit that judges whether the modification is contained in the data in the buffer;
   a write control circuit that rewrites the encoded data stored in the buffer to the data modified by the modification circuit and re-encoded by the encoder circuit when the first operational circuit judges that the modification is contained in the data in the buffer;
   a second operational circuit that judges whether a code length of the encoded data re-encoded by the encoder circuit exceeds a predetermined value, wherein when the first operational circuit judges that the modification is contained in the data in the buffer and the second operational circuit judges that the code length of the re-encoded data does not exceed the predetermined value, the write control circuit rewrites the encoded data stored in the buffer to the data modified by the modification circuit and re-encoded by the encoder circuit.

2. An encoded data modification method, comprising:
   a storing step of storing inputted encoded data formed of a plurality of encoded units in a buffer;
   a modifying step of modifying a first encoded unit of the data stored in the buffer and modifying following encoded units decoded according to the modification;
   an encoding step of re-encoding the modified data;
   a first judging step of judging whether the modification is contained in the data in the buffer; and
   a rewriting step of rewriting the encoded data stored in the buffer to the data modified and re-encoded when the first judging step judges that the modification is contained in the data in the buffer;
   a second judging step of judging whether a code length of the encoded data that is re-encoded exceeds a predetermined value, wherein when the first judging step judges that the modification is contained in the data in the buffer and the second judging step judges that the code length of the re-encoded data does not exceed the predetermined value, the rewriting step rewrites the encoded data stored in the buffer to the data modified and re-encoded.

3. A non-transitory computer-readable storage medium storing an encoded data modification program that causes a computer to perform:

- a storing step of storing, in a buffer, inputted encoded data formed of a plurality of encoded units;
- a modifying step of modifying a first encoded unit of the data stored in the buffer and modifying following encoded units decoded according to this modification;
- an encoding step of re-encoding the modified data;
- a first judging step of judging whether the modification is contained in the data in the buffer;
- a rewriting step of rewriting the encoded data stored in the buffer to the modified and re-encoded data when the first judging step judges that the modification is contained in the data in the buffer;
- a second judging step of judging whether a code length of the encoded data that is re-encoded exceeds a predetermined value; and
- the rewriting step of rewriting the encoded data stored in the buffer to the modified and re-encoded data when the first judging step judges that the modification is contained in the data in the buffer and the second judging step judges that the code length of the encoded data that is re-encoded does not exceed the predetermined value.

* * * * *